United States Patent
Paik et al.

(10) Patent No.: US 11,004,469 B2
(45) Date of Patent: May 11, 2021

(54) CASSETTE SHUTTER (71) Applicant: HYOSUNG TNS INC., Seoul (KR)

(72) Inventors: Seung Tae Paik, Gyeonggi-Do (KR); Ho Keun Lee, Gyeonggi-Do (KR); Tae Gang Kim, Gyeonggi-Do (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 16/335,755

(22) PCT Filed: Jun. 30, 2017

(86) PCT No.: PCT/KR2017/006958
§ 371 (c)(1),
(2) Date: Mar. 22, 2019

(87) PCT Pub. No.: WO2018/056556
PCT Pub. Date: Mar. 29, 2018

(65) Prior Publication Data
US 2019/0251998 A1  Aug. 15, 2019

(30) Foreign Application Priority Data
Sep. 26, 2016  (KR) .................. 10-2016-0122846

(51) Int. Cl.
G11B 23/03 (2006.01)
G11B 17/043 (2006.01)
G07F 19/00 (2006.01)

(52) U.S. Cl.
CPC .......... *G11B 23/0308* (2013.01); *G07F 19/00* (2013.01); *G11B 17/0436* (2013.01); *G11B 23/0316* (2013.01); *G11B 23/0317* (2013.01)

(58) Field of Classification Search
CPC .. G11B 17/0436; G07D 11/40; G07D 11/125; G07D 11/12; G07D 11/00;
(Continued)

(56) References Cited

U.S. PATENT DOCUMENTS 3,785,476 A * 1/1974 Poerink .................. B65G 17/08
198/853
4,337,393 A * 6/1982 Hilton .................... G07D 11/12
235/487

(Continued)

FOREIGN PATENT DOCUMENTS

| JP | 2006_059291 A | 3/2006 |
| JP | 2006_082946 A | 3/2006 |

(Continued)

OTHER PUBLICATIONS

English Translation of KR20140087552A (Year: 2014).*

*Primary Examiner* — Jeffrey A Shapiro
(74) *Attorney, Agent, or Firm* — Bacon&Thomas, PLLC (57) ABSTRACT An object of the present invention is to provide a cassette shutter in which the durability of a curved shutter for opening and closing a medium entrance of a cassette is improved, and assembly of parts is simple. In the present invention for achieving said objective, a cassette shutter, which is slidably disposed on front and bottom surfaces of a cassette storing a paper medium therein and opens and closes an entrance formed in the front surface of the cassette, is configured to include: a plurality of pieces arranged longitudinally and a fastening pin that passes through and thereby fastens a lower portion of an upper-side piece and an upper portion of a lower-side piece so as to enable relative rotation of the plurality of pieces.

6 Claims, 7 Drawing Sheets (58) Field of Classification Search
CPC ...... G07D 11/13; G07D 11/135; G07F 19/20; B65G 17/067; B65G 17/08
USPC .................................................. 198/850–853
See application file for complete search history.

(56) References Cited

U.S. PATENT DOCUMENTS

| | | | | |
|---|---|---|---|---|
| 4,688,670 | A * | 8/1987 | Lapeyre | B65G 17/08 198/853 |
| 5,558,204 | A * | 9/1996 | Daringer | B65G 15/54 198/778 |
| 6,059,090 | A * | 5/2000 | Davis | G07B 15/066 194/350 |
| 6,732,856 | B2 * | 5/2004 | Maine, Jr. | B65G 17/08 198/850 |
| 2004/0207143 | A1 * | 10/2004 | Beskitt | G07D 11/0096 271/1 |
| 2005/0126896 | A1 * | 6/2005 | Wieting | B65G 17/24 198/853 |
| 2011/0155736 | A1 * | 6/2011 | Berendes | G07D 11/125 220/324 |
| 2013/0048473 | A1 * | 2/2013 | Gough | B65G 17/067 198/836.1 |
| 2013/0319830 | A1 * | 12/2013 | Ota | B65G 21/2018 198/853 |
| 2015/0248802 | A1 * | 9/2015 | Go | G07D 11/125 232/1 D |
| 2015/0248803 | A1 * | 9/2015 | Geesmeier | G07D 11/13 194/206 |
| 2015/0251861 | A1 * | 9/2015 | Go | B65H 1/022 271/160 |
| 2015/0379800 | A1 * | 12/2015 | Schild | G07D 11/225 235/7 R |
| 2016/0023854 | A1 * | 1/2016 | Plotzitzka | G07D 11/12 271/163 |
| 2016/0185531 | A1 * | 6/2016 | Fransen | B65G 17/067 198/617 |

FOREIGN PATENT DOCUMENTS

| | | | | |
|---|---|---|---|---|
| JP | 2007-128140 | A | 5/2007 | |
| JP | 2011-141637 | A | 7/2011 | |
| KR | 10-2004-0105197 | A | 12/2004 | |
| KR | 20140087552 | A * | 7/2014 | ............ G07D 11/12 |

* cited by examiner

FIG.10

CASSETTE SHUTTER

TECHNICAL FIELD

The present invention relates to a cassette shutter, and more particularly, to a cassette shutter including a curved shutter formed by connecting a plurality of pieces for opening and closing an entrance of a cassette so that durability and ease of assembly are improved.

BACKGROUND ART

An automated teller machine is an automated device for providing basic financial services such as a deposit or a withdrawal without a bank clerk regardless of time and place in terms of financial services. Recently, the automated teller machine is variously used for depositing or withdrawing a paper medium such as a bill or a check, updating a bankbook, paying charges by an electronic billing system, issuing a ticket, etc.

A medium feeding mechanism for feeding a paper medium is provided in the automated teller machine, and a cassette in which a paper medium is stored is widely used as the medium feeding mechanism.

An entrance of a paper medium is provided at the front surface of the cassette, and the entrance can be opened and closed by a shutter slidably disposed at front and bottom surfaces of the cassette. The cassette can be detachably received in a cassette receiving part, and when the cassette is received, the cassette slidingly moves inside the cassette receiving part and the shutter slidingly moves rearward along the bottom surface of the cassette so that the entrance of the cassette is opened, which becomes a state in which a medium transport mechanism connected to the entrance performs a withdrawal operation of a medium. When the cassette is withdrawn outside of the cassette receiving part, the shutter slidingly moves forward to close the entrance.

The shutter of the cassette formed with such an above-described structure connects the front and bottom surfaces of the cassette according to the installation structure and slidingly moves while bending in a curved shape so that the cassette is opened or closed. The conventional shutter is made of a synthetic resin material and is formed in an integral structure. The related art of the cassette shutter is disclosed in Korean Laid-Open Patent No. 10-2013-0075904 and in Korean Registered Patent No. 10-1310466.

However, there is a problem in that, when the shutter is integrally formed, a bending part is torn and damaged by opening and closing operations of the shutter that are repeated for a long time, which leads to low durability.

DISCLOSURE

Technical Problem

The present invention is directed to providing a cassette shutter in which the durability of a curved shutter for opening and closing a medium entrance of a cassette is improved and assembly of parts is simple.

Technical Solution

One aspect of the present invention provides a cassette shutter which is slidably disposed at front and bottom surfaces of a cassette for storing a paper medium therein and opens and closes an entrance formed at the front surface of the cassette, is configured to include a plurality of pieces disposed in a vertical direction thereof and a fastening pin that passes through and fastens a lower portion of the upper piece of two of the plurality of pieces and an upper portion of the lower piece adjacent to the upper piece such that the plurality of pieces are relatively rotatable.

The plurality of pieces may be formed in the same shape, and a first fastening pin insertion hole and a second fastening pin insertion hole may be formed in a first receiving groove at the upper portion of the piece with a first receiving groove disposed therebetween. A third fastening pin insertion hole corresponding to the first receiving groove, a second receiving groove and a third receiving groove corresponding to the first fastening pin insertion hole and the second fastening pin insertion hole may be formed in the lower portion of the piece with the third fastening pin insertion hole disposed therebetween.

The third fastening pin insertion hole of the upper piece may be disposed to correspond to the first receiving groove of the lower piece, the first fastening pin insertion hole and the second fastening pin insertion hole of the lower piece may be disposed to correspond to the second receiving groove and the third receiving groove of the upper piece, respectively, and the fastening pin may sequentially pass through and fasten the first fastening pin insertion hole of the lower piece, the third fastening pin insertion hole of the upper piece, and the second fastening pin insertion bole of the lower piece.

The plurality of pieces may be formed in the same shape and disposed in a horizontal direction. A fastening projection may be formed on one side of the piece, and a fastening groove corresponding to the fastening projection may be formed in the other side of the piece, and therefore the fastening projection of the piece located on the one side may be inserted into and coupled to the fastening groove of the piece located on the other side.

A vertical stripe-like uneven part may be formed at the entire front surface part of the piece.

The plurality of pieces may be configured to reciprocate along a curved surface when the entrance of the cassette is opened or closed.

The upper portions of the uppermost pieces of the plurality of pieces may be coupled to an upper plate, in which the plurality of fastening pin insertion holes, which are received in the first receiving grooves, and the plurality of receiving grooves for receiving the first fastening pin insertion holes and the second fastening pin insertion holes therein are formed, by the fastening pin.

The upper plate may be configured to reciprocate in the vertical direction when the entrance of the cassette is opened and closed.

The lower portions of the lowermost pieces of the plurality of pieces may be coupled to a lower plate, in which the plurality of fastening pin insertion holes, which are received in the second receiving grooves and the third receiving grooves, and the plurality of receiving grooves for receiving the third fastening pin insertion holes are formed, by the fastening pin.

The lower plate may be configured to reciprocate in a horizontal direction when the entrance of the cassette is opened or closed.

Advantageous Effects

According to a cassette shutter of the present invention, a curved shutter is formed by connecting a plurality of pieces for opening and closing an entrance of a cassette, and therefore damage to the shutter occurring when using the conventional integral-type shutter is prevented so that the durability can be improved.

Furthermore, a plurality of pieces are formed in the same shape and configured to be mutually assembled in vertical and horizontal directions, and therefore ease of assembly of parts included in the shutter can be improved.

Furthermore, a fastening projection and a fastening groove are formed at both sides of the piece so that the pieces are inserted into and coupled to each other in a horizontal direction, and therefore security can be ensured by blocking a gap between the pieces assembled adjacent to each other, and a visual effect for improving the exterior can be obtained by allowing an overlapping part between the pieces and the rest of the part to not be distinguished from each other.

DESCRIPTION OF REFERENCE NUMERALS

1: CASSETTE 10: CASSETTE SHUTTER
20: CASSETTE BODY 21: ENTRANCE
100: INTERMEDIATE PART OF CASSETTE SHUTTER
110, 110-1, 110-2, 110-3: PIECE
111: BODY PART OF PIECE 111a: UNEVEN PART
112: FASTENING PROJECTION 113: FASTENING GROOVE
114: FIRST FASTENING PIN INSERTION HOLE 115: SECOND FASTENING PIN INSERTION HOLE
116: FIRST RECEIVING GROOVE 117: THIRD FASTENING PIN INSERTION HOLE
118: SECOND RECEIVING GROOVE 119: THIRD RECEIVING GROOVE
200: UPPER PART OF CASSETTE SHUTTER 210: UPPER PLATE
211: BODY PART OF UPPER PLATE 212, 213, 214: FASTENING PIN INSERTION HOLE
215, 216, 217, 218: RECEIVING GROOVE 219: GUIDE PROJECTION
300: LOWER PART OF CASSETTE SHUTTER 310: LOWER. PLATE
311: BODY PART OF LOWER PLATE 312, 313, 314, 315: FASTENING PIN INSERTION HOLE
316, 317, 318: RECEIVING GROOVE 400: FASTENING PIN

MODES OF THE INVENTION

Hereinafter, a configuration and operations of exemplary embodiments of the present invention will be described in detail with reference to the accompanying drawings.

Figure 1:
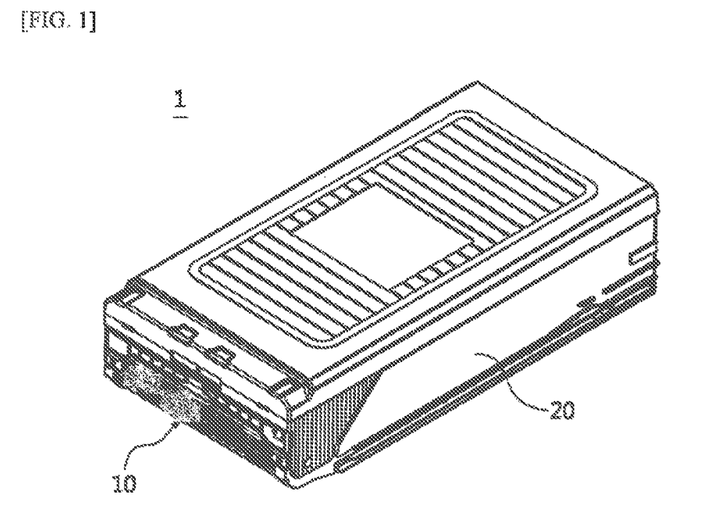
FIG. 1 is a perspective view of a cassette to which the present invention is applied.
Figure 2:
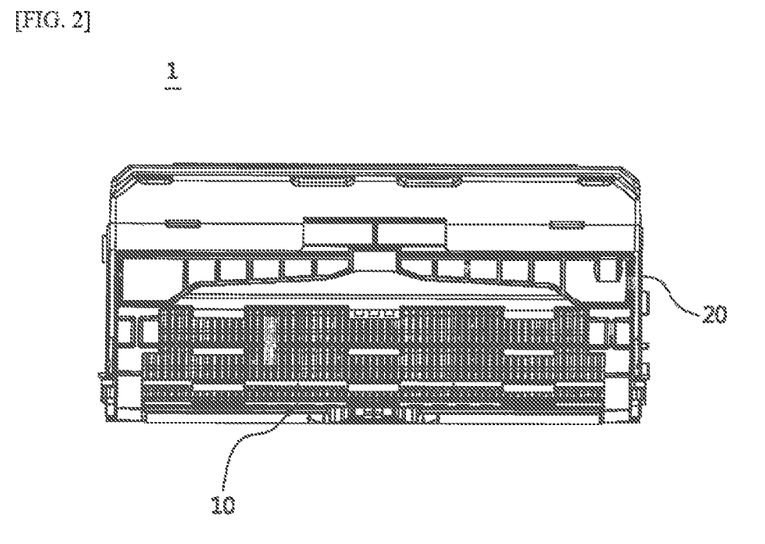
FIG. 2 is a front view of FIG. 1.
Figure 3:
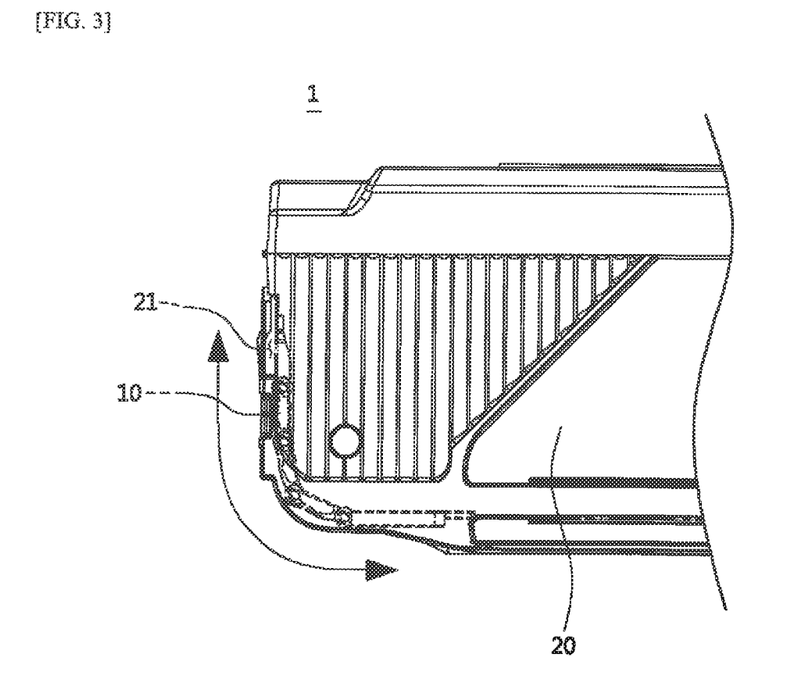
FIG. 3 is a partial side view of FIG. 2.

Referring to FIGS. 1 to 3, a cassette 1 to which the present invention is applied includes a cassette body 20 for storing a paper medium therein, and a cassette shutter 10 for opening and closing an entrance 21 formed at a front surface of the cassette body 20.

The cassette shutter 10 is slidably provided at front and bottom surfaces of the cassette body 20 as shown with a double arrow in FIG. 3.

In an embodiment, when the cassette 1 is received in a cassette receiving part (not shown), the cassette shutter 10 slidingly moves rearward along the bottom surface of the cassette body 20 by a lever for opening and closing a shutter (not shown) provided at the cassette receiving part, and the entrance 21 is opened. Here, the paper medium stored in the cassette body 20 is in a state in which a withdrawal is possible with a medium transport part (not shown).

Furthermore, the cassette shutter 10 may be configured to return in a direction which closes the entrance 21 when the cassette 1 is withdrawn outside the cassette receiving part.

Figure 4:
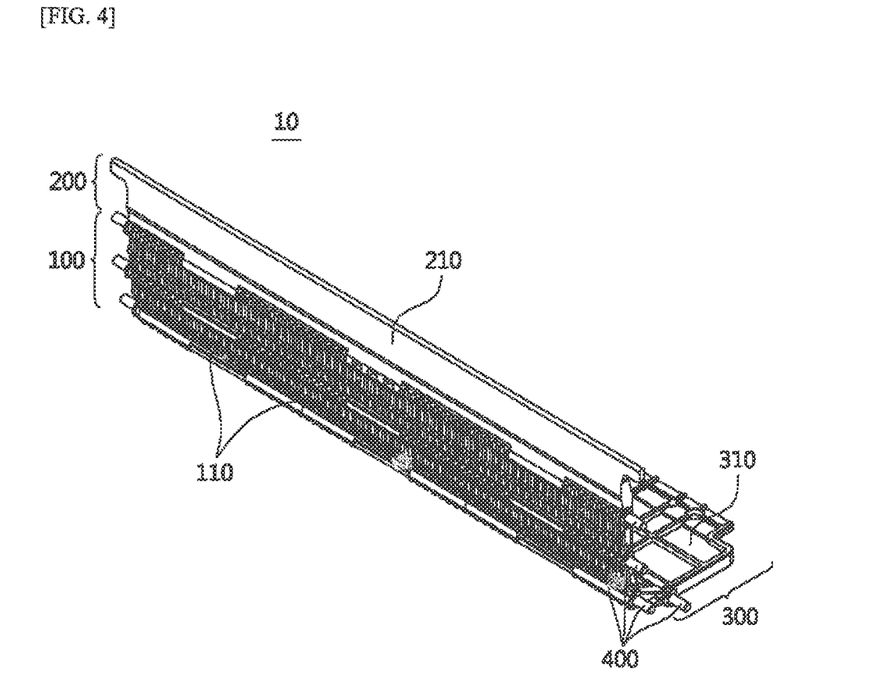
FIG. 4 is a front perspective view of a cassette shutter according to the present invention.
Figure 5:
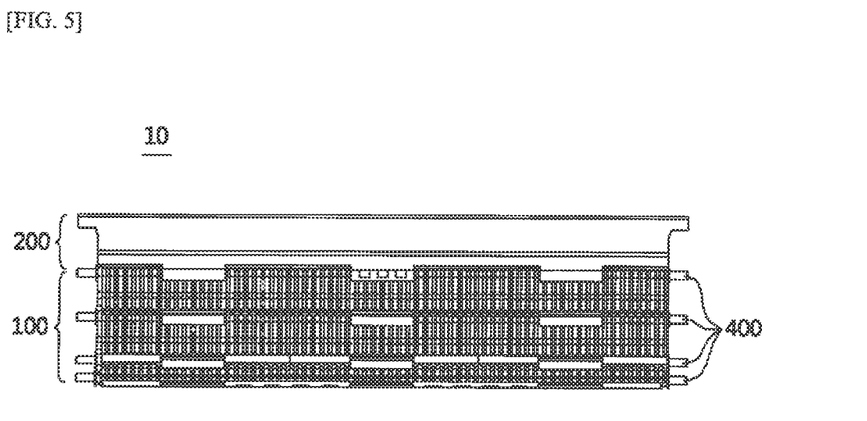
FIG. 5 is a front view of the cassette shutter according to the present invention.
Figure 6:
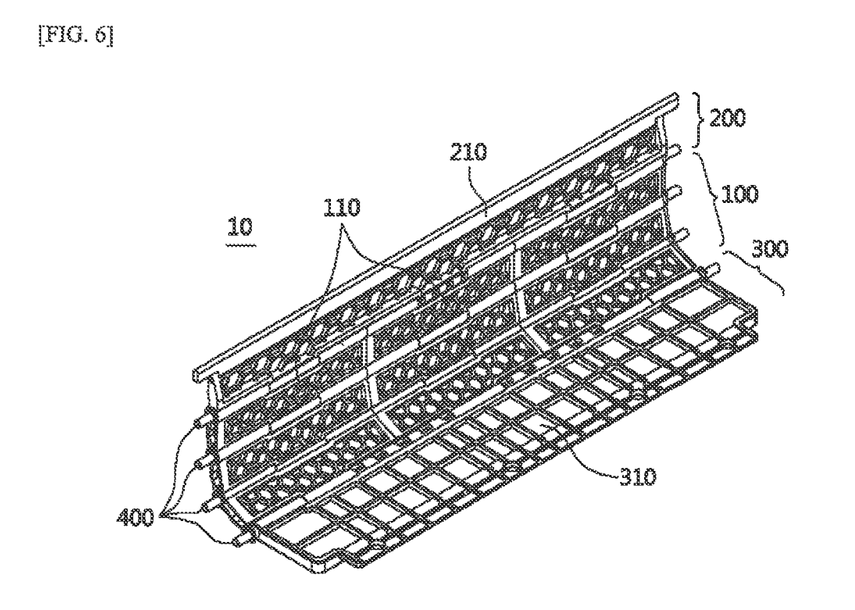
FIG. 6 is a rear perspective view of the cassette shutter according to the present invention.

Referring to FIGS. 4 to 6, the cassette shutter 10 according to the present invention is provided with a shutter intermediate part 100 in which a plurality of pieces 110 are coupled to each other in vertical and horizontal directions by fastening pins 400, a shutter upper part 200 including an upper plate 210 coupled to an upper portion of the shutter intermediate part 100 by a fastening pin 400, and a shutter lower part 300 including a lower plate 310 coupled to a lower portion of the shutter intermediate part 100 by a fastening pin 400.

When the cassette shutter 10 moves in a direction of a double arrow shown in FIG. 3 to open or close the entrance 21 formed at the front surface of the cassette body 20, the plurality of pieces 110 included in the shutter intermediate part 100 reciprocate along a curved surface, the upper plate 210 included in the shutter upper part 200 reciprocates in a vertical direction, and the lower plate 310 included in the shutter lower part 300 reciprocates in the horizontal direction while being supported by the bottom surface of the cassette body 20.

Hereinafter, with reference to FIGS. 7A to 10, configurations of the piece 110, the upper plate 210, and the lower plate 310 which are included in the shutter intermediate part 100, the shutter upper part 200, and the shutter lower part 300 of the cassette shutter 10 of the present invention, and an assembly structure therebetween will be described.

Figure 7A:
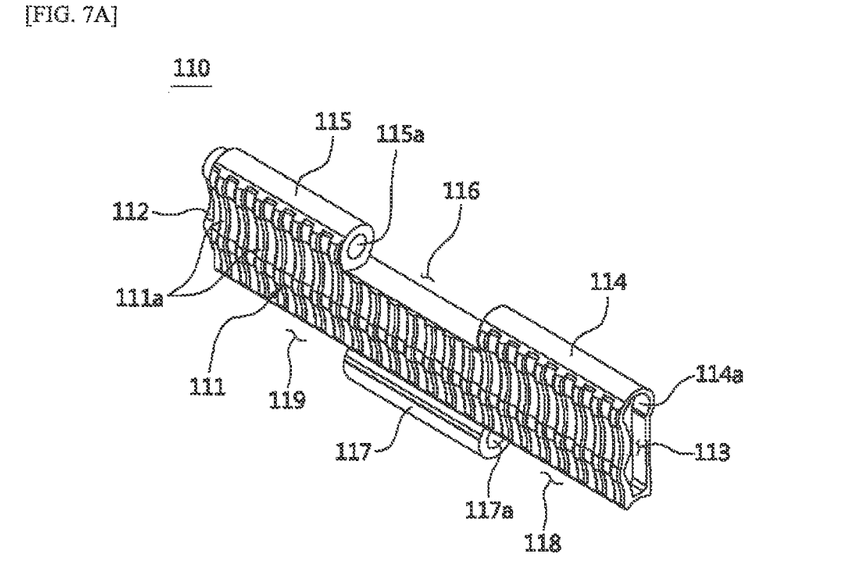
FIG. 7A and FIG. 7B are a perspective view of a piece provided in an intermediate part of the cassette shutter according to the present invention which is viewed in directions different from each other.
Figure 7B:
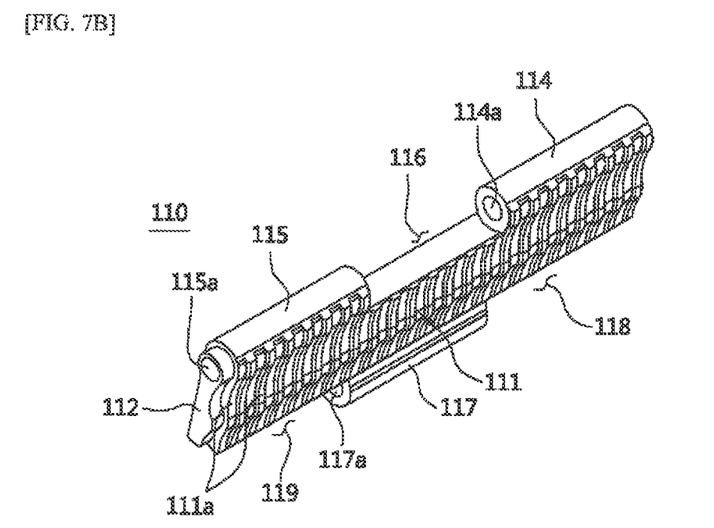
Figure 10:
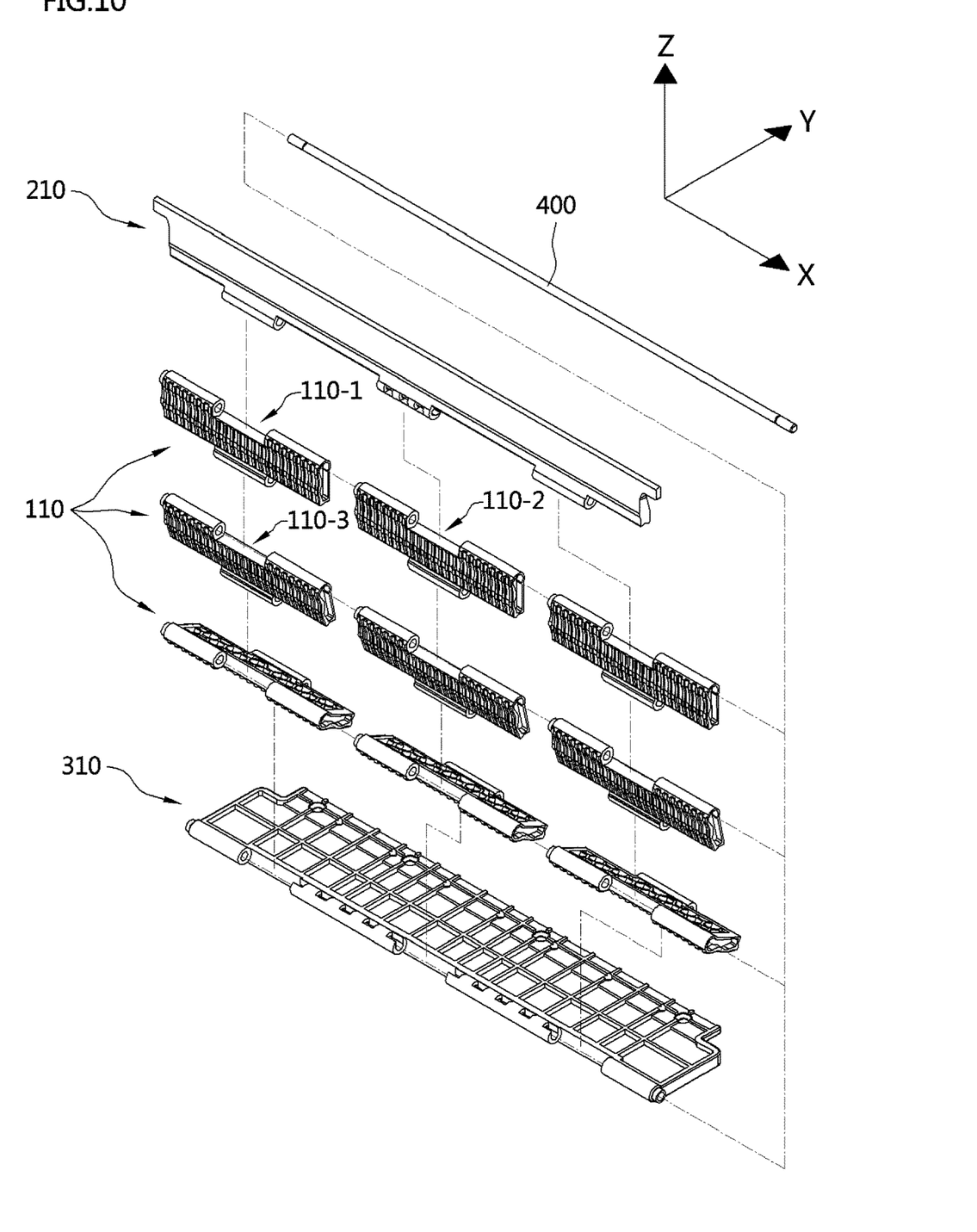
FIG. 10 is an exploded perspective view showing an assembly structure of the cassette shutter according to the present invention.

Referring to FIG. 7A and FIG. 7B, the piece 110 is provided with a body part 111 in which a fastening projection 112 and a fastening groove 113 in a shape corresponding to each other are formed at both sides thereof. Therefore, the fastening projection 112 formed at a piece 110-2 on one side is inserted into and coupled to the fastening groove 113 formed in a piece 110-1 on the other side between the pieces 110-1 and 110-2 which are adjacent and assembled in the horizontal direction as shown in FIG. 10. For reference, the horizontal direction corresponds to the Y-axis direction of the illustrated Cartesian coordinate system.

In this manner, the pieces 110A and 110-2 are inserted into and coupled to each other by the fastening projection 112 and the fastening groove 113, and therefore security can be ensured by blocking a gap between the pieces 110-1 and 110-2 which are adjacent and assembled so that the inside of the cassette 1 may not be seen from the outside.

In addition, a vertical snipe-like uneven part 111a may be formed at the entire front surface part of the piece 110. In this manner, an overlapping part between the pieces 110-1 and 110-2 disposed in the horizontal direction and the rest of the part are not distinguishable from each other by forming the uneven part 111a at the front surface part of the piece 110. Therefore, the exterior of the shutter intermediate part 100 has a uniform shape so that a visual effect which improves the exterior can be obtained.

Meanwhile, a first fastening pin insertion hole 114 and a second fastening pin insertion hole 115 are formed in a first receiving groove 116 at an upper portion of the body part 111 with the first receiving groove disposed therebetween. A third fastening pin insertion hole 117 corresponding to the first receiving groove 116, a second receiving groove 118 and a third receiving groove 119 corresponding to the first fastening pin insertion hole 114 and the second fastening pin insertion hole 115 are formed at a lower portion of the body part 111 with the third fastening pin insertion hole disposed therebetween.

Therefore, as shown in FIG. 10, between the pieces 110-1 and 110-3 which are adjacent and assembled in the vertical direction (the Z-axis direction of the Cartesian coordinate system shown in FIG. 10), the third fastening pin insertion hole 117 of the upper piece 110-1 is disposed in the first receiving groove 116 of the lower piece 110-3, and the first fastening pin insertion hole 114 and the second fastening pin insertion hole 115 of the lower piece 110-3 are disposed in the second receiving groove 118 and the third receiving groove 119 of the upper piece 110-1, respectively.

In this state, the fastening pin 400 sequentially passes through and fastens the first fastening pin insertion hole 114 of the lower piece 110-3, the third fastening pin insertion hole 117 of the upper piece 110-1, and the second fastening pin insertion hole 115 of the lower piece 110-3. The reference numerals 114a, 115a, and 117a which are not described herein illustrate a hollow part through which the fastening pin 400 passes.

In this manner, the pieces 110-1 and 110-3 disposed in the vertical direction (the Z-axis direction shown in FIG. 10) are coupled to each other by the fastening pin 400 to be relatively rotatable, and therefore the shutter intermediate part 100 is capable of reciprocating smoothly along a curved surface when an opening or closing operation of the cassette shutter 10 are performed, and even when the opening or closing operation of the cassette shutter 10 are repeatedly performed for a long time, damage to the cassette shutter 10 may be prevented. Therefore, the problem of low durability caused by damage to the shutter when the conventional shutter with an integral structure is used may be addressed.

Figure 8:
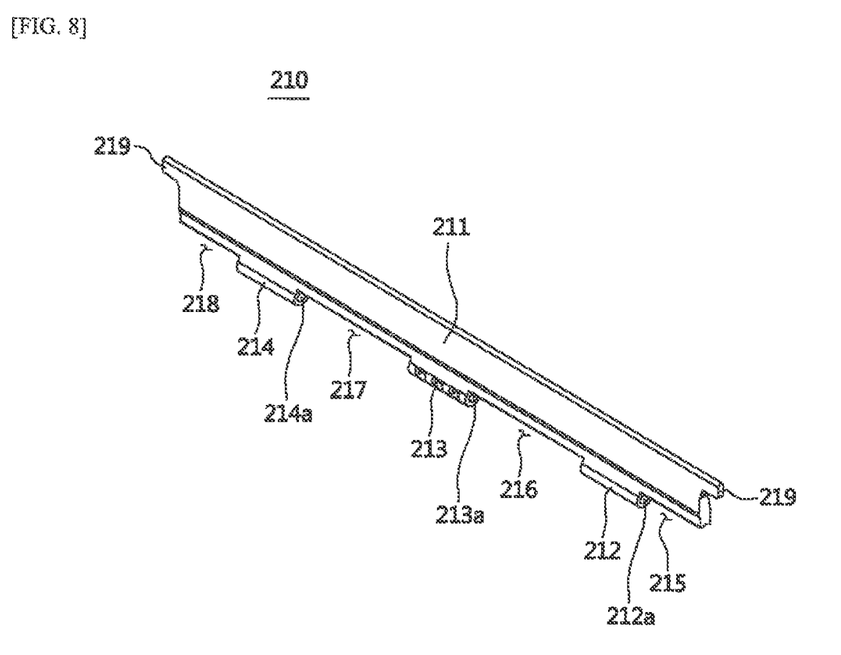
FIG. 8 is a perspective view illustrating an upper part of the cassette shutter according to the present invention.

Referring to FIG. 8, the upper plate 210 included in the shutter upper part 200 of the cassette shutter 10 is coupled to upper portions of the uppermost pieces 110 of the plurality of pieces 110. For the configuration, a plurality of fastening pin insertion holes 212, 213, and 214 which are received in the first receiving grooves 116 of the pieces 110, and a plurality of receiving grooves 215, 216, 217, and 218 for receiving the first fastening pin insertion holes 114 and the second fastening pin insertion holes 115 of the pieces 110 therein are formed in a lower portion of a body part 211 of the upper plate 210.

Furthermore, the fastening pin 400 passes through and fastens the first fastening pin insertion holes 114 and the second fastening pin insertion holes 115 of the pieces 110 and the fastening pin insertion holes 212, 213, and 214 of the upper plate 210. The reference numerals 212a, 213a, and 214a which are not described herein illustrate a hollow part through which the fastening pin 400 passes.

Furthermore, a guide projection 219 is formed at both side ends of the upper plate 210 such that the upper plate is lifted and moved while being supported by a guide rail (not shown) vertically formed inside of the front part of the cassette body 20.

In this manner, the uppermost pieces 110 are coupled to the upper plate 210 by the fastening pin 400 to be relatively rotatable, and therefore the upper plate 210 reciprocates in the vertical direction while the pieces 110 coupled to the upper plate smoothly rotate along a curved surface.

Figure 9:
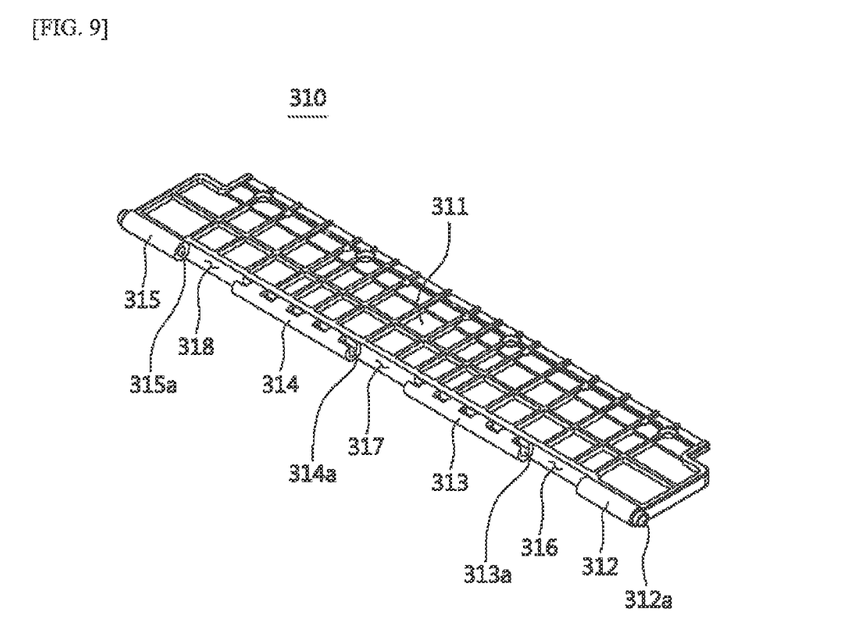
FIG. 9 is a perspective view illustrating a lower part of the cassette shutter according to the present invention.

Referring to FIG. 9, the lower plate 310 included in the shutter lower part 300 of the cassette shutter 10 is coupled to lower portions of the lowermost pieces 110 of the plurality of pieces 110. For the configuration, the second receiving grooves 118 and the third receiving grooves 119 of the pieces 110 for receiving a plurality of fastening pin insertion holes 312, 313, 314, and 315 therein and a plurality of receiving grooves 316, 317, and 318 in which the third fastening pin insertion holes 117 are received are formed in a front end of a body part 311 of the lower plate 310.

Furthermore, the fastening pin 400 passes through and fastens the fastening pin insertion holes 312, 313, 314, and 315 of the lower plate 310 and the third fastening pin insertion hole 117 of the piece 110. The reference numerals 312a, 313a, 314a, and 315a which are not described herein illustrate a hollow part through which the fastening pin 400 passes.

In this manner, the lowermost pieces 110 are coupled to the lower plate 310 by the fastening pin 400 to be relatively rotatable, and therefore the lower plate 310 reciprocates in the horizontal direction corresponding to the Y-axis direction shown in FIG. 10 while the pieces 110 coupled to the lower plate smoothly rotate along a curved surface.

As described above, the invention is not limited to the above-described embodiments, and it should be understood that various modified embodiments may be made by those skilled in the art therein without departing from the spirit and scope of embodiments as defined by the appended claims, and such modified embodiments are within the scope of the present invention.

The invention claimed is:

1. A cassette shutter which is slidably disposed at front and bottom surfaces of a cassette for storing a paper medium therein and opens and closes an entrance formed at the front surface of the cassette the cassette shutter comprising:
   a plurality of pieces coupled to each other in an X-axis direction and a Z-axis direction of a Cartesian coordinate system; and
   a first fastening pin configured to pass through and fasten a lower portion of the upper piece of two of the plurality of pieces and an upper portion of the lower piece adjacent to the upper piece such that the plurality of pieces are relatively rotatable,
   wherein:
   the plurality of pieces are formed in the same shape;
   a first fastening pin insertion hole and a second fastening pin insertion hole are formed in an upper portion of each respective piece with a first receiving groove disposed therebetween;
   a third fastening pin insertion hole corresponding to the first receiving groove, a second receiving groove and a third receiving groove corresponding to the first fastening pin insertion hole and the second fastening pin insertion hole are formed in a lower portion of each of each respective piece with the third fastening pin insertion hole disposed therebetween; and a fastening projection is formed on one side of each respective piece, and a fastening groove corresponding to the fastening projection is formed in the other side of the respective piece so that the fastening projection of one of the plurality of pieces located on the one side is inserted into and coupled to the fastening groove of another of the plurality of pieces located on the other side, the upper portions of the uppermost pieces of the plurality of pieces are coupled to an upper plate, in which the plurality of fastening pin insertion holes, which are received in the first receiving grooves, and the plurality of receiving grooves for receiving the first fastening pin insertion holes and the second fastening pin insertion holes are formed, by a second fastening pin, and the lower portions of the lowermost pieces of the plurality of pieces are coupled to a lower plate, in which the plurality of fastening pin insertion holes, which are received in the second receiving grooves and the third receiving grooves, and the plurality of receiving grooves for receiving the third fastening pin insertion holes are formed, by a third fastening pin.

2. The cassette shutter of claim 1, wherein:
the third fastening pin insertion hole of the upper piece is disposed to correspond to the first receiving groove of the lower piece;
the first fastening pin insertion hole and the second fastening pin insertion hole of the lower piece are disposed to correspond to the second receiving groove and the third receiving groove of the upper piece, respectively; and
the first fastening pin sequentially passes through and fastens the first fastening pin insertion hole of the lower piece, the third fastening pin insertion hole of the upper piece, and the second fastening pin insertion hole of the lower piece.

3. The cassette shutter of claim 1, wherein a vertical stripe-like uneven part is formed at the entire front surface part of the piece.

4. The cassette shutter of claim 1, wherein the plurality of pieces reciprocate along a curved surface when the entrance of the cassette is opened or closed.

5. The cassette shutter of claim 1, wherein the upper plate reciprocates in the Z axis direction when the entrance of the cassette is opened and closed.

6. The cassette shutter of claim 1, wherein the lower plate reciprocates in a Y axis direction of the Cartesian coordinate system when the entrance of the cassette is opened or closed.

* * * * *